S. C. EDDY.
DEMOUNTABLE RIM.
APPLICATION FILED NOV. 3, 1913.
1,100,719.
Patented June 23, 1914.
2 SHEETS—SHEET 1.
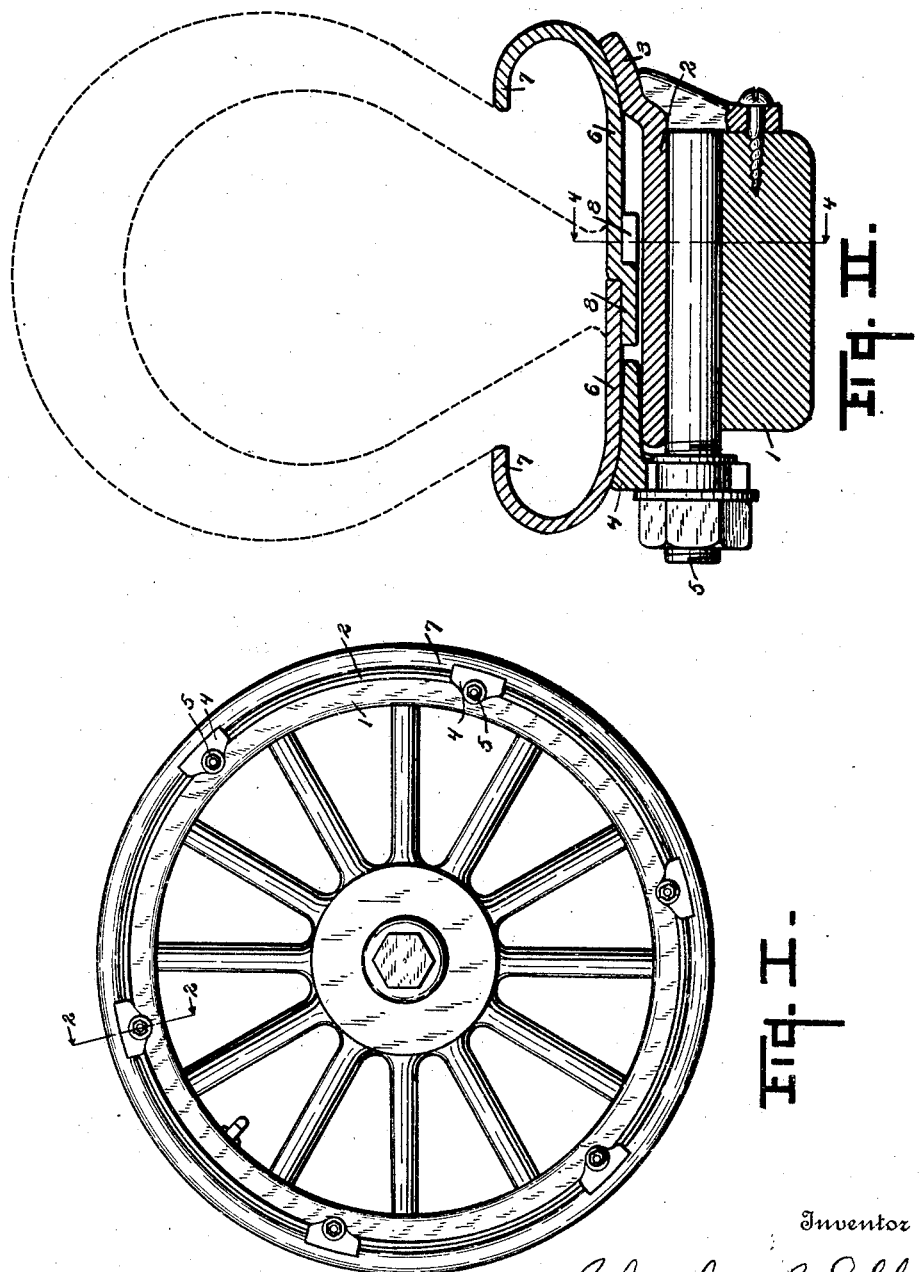

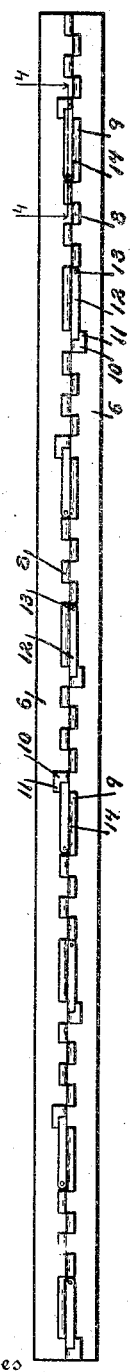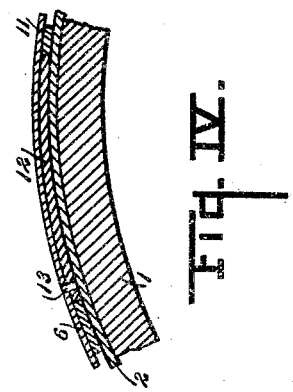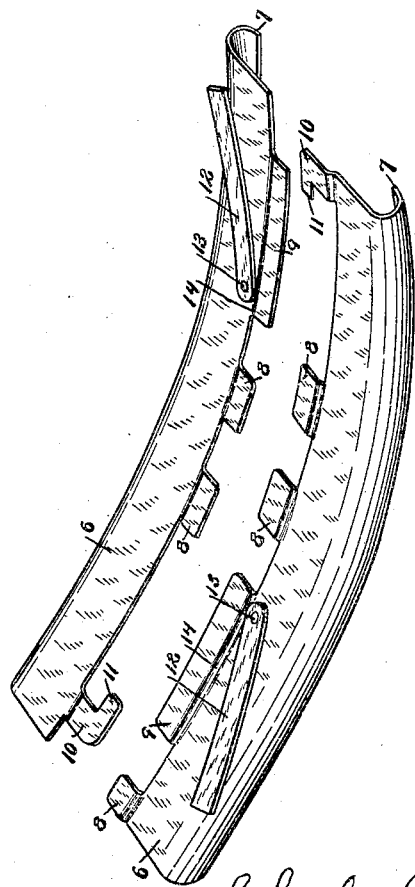

UNITED STATES PATENT OFFICE.

SCHUYLER C. EDDY, OF KALAMAZOO, MICHIGAN.

DEMOUNTABLE RIM.

1,100,719.  Specification of Letters Patent.  Patented June 23, 1914.

Application filed November 3, 1913. Serial No. 798,885.

*To all whom it may concern:*

Be it known that I, SCHUYLER C. EDDY, a citizen of the United States, residing at Kalamazoo, Michigan, have invented certain new and useful Improvements in Demountable Rims, of which the following is a specification.

This invention relates to improvements in demountable rims.

The main objects of this invention are: First, to provide an improved demountable rim for automobile wheels which may be very quickly and easily placed upon the tire. Second, to provide an improved demountable rim in which the parts are so formed and united that they are not likely to become stuck together by corrosion or so distorted as to prevent their ready disassembling to remove the tire. Third, to provide an improved demountable rim having these advantages which is very simple and economical in structure and at the same time, one which provides a satisfactory seat and support for the tire and is very convenient to manipulate and durable in use.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is an elevation of a wheel embodying the features of my invention. Fig. II is a radial section through the rim of the wheel on a line corresponding to line 2—2 of Fig. I, the tire being indicated by dotted lines. Fig. III is an inside view of the demountable rim with the members in their joined or coupled position extended in the flat. Fig. IV is a detail section of the wheel perpendicular to its axis, on a line corresponding to line 4—4 of Fig. III. Fig. V is a detail perspective view of a section of the demountable rim showing the two members in separated relation.

In the drawing, similar reference characters refer to similar parts throughout the several views, and the sectional views are taken looking in the direction of the little arrows at the ends of the section lines.

Referring to the drawing, I have shown my improvements embodied in a complete wheel of the "artillery type."

The felly rim 1 in the structure illustrated, is of wood and provided with a metal band 2 having a flange-like seat 3 at one side for the demountable rim. The demountable rim is secured by the wedge members 4 secured by the bolts 5 to clamp and support the demountable rim as is well understood.

My improved demountable rim comprises a pair of annular members 6 having tire channel flanges 7 at their outer edges. These flanges are adapted to receive the beads of the tire, as is shown in Fig. II, and are of any desired shape for the purpose, depending on the style of tire. At their inner edges, the members 6 are provided with laterally projecting tongues or lugs 8, 9 and 10, the lugs of one member being spaced to interlock with those of the other member. These lugs are offset inwardly to lap within the inner sides of the members, as clearly shown in the drawing. The offsets are substantially the thickness of the rim members from which they are formed by stamping or bending. The lugs engage the inner sides of the members and permit the members to lie edge to edge, forming a substantially continuous outer surface to receive the tire. See Fig. II.

The lugs interlock so as to prevent circumferential movement of one member relative to the other. The lugs 10 are provided with keepers 11. Each rim member is provided with several of these lugs 10 having keepers thereon. The keepers are disposed circumferentially of the rim and are engaged by the blade-like lock members 12 pivoted at 13 to swing against the shoulders 14 of the lugs 9 when the lock members are engaged with the keepers. These lock members are preferably of spring material so that they are retained in engagement with the lugs by their own resiliency. The lugs 9 are, in the structure illustrated, longer than the lugs 8. With the lock members thus positioned, they may be readily engaged or disengaged from the keepers and when engaged are, as stated, supported by engaging the shoulders of adjacent lugs, thus making the structure exceedingly simple and economical to produce.

The lugs are preferably formed integrally with the rim members as shown. The lug members are engaged and disengaged by an axial movement, the lugs interlocking so as to prevent any relative circumferential movement between the parts. This is of great advantage in assembling or mounting the tire on the rim as it is only necessary to engage the channel flanges with the beads of the tire and push the members together edge to edge. The lock members may then be engaged, the tire can be inflated, and the rim is ready for mounting.

In removing the tire, it is only necessary to disengage the lock members which permits the parts to be readily separated. No special tool or machine is required; no circumferential movement is required. This coupling of the members is easily accomplished.

The lugs are alternated so that they are substantially continuous throughout the rim.

My improved demountable rim is, as stated, very simple and economical in structure; for instance, the rim members are formed by the same die. The tire may be quickly mounted upon and removed therefrom, and there are no parts to interfere with its being readily slipped upon or removed from the wheel. The parts are securely retained by the wedges or other means.

I have illustrated and described my improved demountable rim in a simple embodiment thereof. I have not attempted to illustrate or describe certain modifications which I contemplate as I believe the disclosure made will enable those skilled in the art to which my invention relates to embody and adapt the same as may be desired. I desire, however, to be understood as claiming my improvements specifically in the form illustrated as well as broadly within the scope of the appended claims.

Having thus described my invention, what I claim as new and desire to secure by Letters Patent is:—

1. A demountable rim comprising a pair of annular rim members provided with channel flanges and having integral laterally projecting lugs at their inner edges interlocking to prevent circumferential movement of one member relative to the other, the lugs being offset inwardly to lap the inner sides of the members, a part of the lugs of each member having keepers therein, and lock members of spring material pivoted on said rim members, each lock member being disposed to spring into position to coact with a keeper carried by the opposite rim member, the body portion of said lock member abutting one of the lug members carried by the rim member to which said lock member is pivotally secured.

2. A demountable rim comprising a pair of annular rim members provided with channel flanges and having integral laterally projecting lugs at their inner edges interlocking to prevent circumferential movement of one member relative to the other, the lugs being offset inwardly to lap the inner sides of the members, the outer faces of said lugs being disposed flat against the inner faces of said members, a part of the lugs of each member being provided with keepers and lock members of spring material pivoted on said rim members and disposed to spring into position to coact with a keeper carried by the opposite rim member, and stop means on said rim members coacting with the body portions of the lock members carried thereby.

3. A demountable rim comprising a pair of annular rim members disposed edge to edge and provided with axially disposed interlocking lugs offset inwardly to lap the inner sides of the members, the width of the lugs corresponding to the spaces between the co-acting interlocking lugs whereby the members may be joined and separated by axial movement and are supported against relative circumferential movement, and means for securing said members against axial separation.

4. A demountable rim comprising a pair of annular rim members disposed edge to edge and provided with laterally projecting lugs disposed to lap the inner sides of the members and so that the edges of coacting lugs are brought into interlocking engagement by axial movement of said members and said members are supported against relative circumferential movement, and means for securing said members against axial separation.

In witness whereof, I have hereunto set my hand and seal in the presence of two witnesses.

SCHUYLER C. EDDY. [L. S.]

Witnesses:
MARGARET L. GLASGOW,
LUELLA G. GREENFIELD.

Copies of this patent may be obtained for five cents each, by addressing the "Commissioner of Patents, Washington, D. C."